US006364534B1

(12) United States Patent
Lampert (10) Patent No.: US 6,364,534 B1
(45) Date of Patent: Apr. 2, 2002

(54) PANEL MOUNTING ASSEMBLY FOR OPTICAL FIBER CONNECTORS

(75) Inventor: Norman R. Lampert, Norcross, GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/515,976

(22) Filed: Feb. 29, 2000

(51) Int. Cl.$^7$ ................................................ G02B 6/36
(52) U.S. Cl. ............................ 385/53; 385/56; 385/59
(58) Field of Search .............................. 385/56, 58, 59, 385/60, 53

(56) References Cited

U.S. PATENT DOCUMENTS

| | | | |
|---|---|---|---|
| 3,168,612 A | 2/1965 | Sorenson | 174/57 |
| 5,067,783 A | 11/1991 | Lampert | 385/60 |
| 5,073,042 A | * 12/1991 | Mulholand et al. | |
| 5,142,597 A | 8/1992 | Mulholland et al. | 385/56 |
| 5,274,729 A | 12/1993 | King et al. | 385/134 |
| 5,384,885 A | 1/1995 | Diner | 385/140 |
| 5,481,634 A | 1/1996 | Anderson et al. | 385/76 |
| 5,937,121 A | * 8/1999 | Ott et al. | |

FOREIGN PATENT DOCUMENTS

| | | | |
|---|---|---|---|
| DE | 2 306 331 | 8/1974 | |
| DE | 29508282 U1 | 9/1996 | ............ H02B/1/044 |
| EP | 1026528 A1 | 8/2000 | ............ G02B/6/38 |
| FR | 2 194 032 | 2/1974 | ............ H01H/13/00 |
| WO | WO99/21040 | 4/1999 | ............ G02B/6/38 |

OTHER PUBLICATIONS

Density and Performance Backplane Solutions by Molex (brochure) 1 page, May 20, 1999.
Miniature Optical Connector with Small Zirconia Ferrule, by Nagase et al., pp. 1–8, Jul. 18, 1991.

* cited by examiner

Primary Examiner—Hung N. Ngo
(74) Attorney, Agent, or Firm—Needle & Rosenberg, P.C.; Charles H. Fails, Esq.

(57) ABSTRACT

A panel mounting assembly for use with optical fiber connectors is disclosed. The panel mounting assembly includes at least one receptacle, and a clip constructed and arranged to be mated to the receptacle. The receptacle is provided with a body portion having a first end and a spaced second end, a pair of spaced sides extending between the ends, and at least one optical fiber connector opening defined within the body. The clip is provided with at least one elongate tongue, the tongue having a spaced series of teeth extending at least partially along the length thereof. The tongue of the clip is intended to be received in at least one elongate slot defined within the body of the receptacle, and a tooth is formed within the elongate slot of the body for being engaged with the teeth of the at least one tongue of the clip. The receptacle is positioned on a first side of a mounting panel such that it extends across a panel opening formed therein, whereupon the clip is positioned on a second side of the mounting panel, the tongue, or tongues of the clip being passed through the panel opening and into and through the slot, or slots defined in the receptacle, for securely positioning the receptacle on the mounting panel. A spring is formed in the sides of the clip, and is constructed to urge the receptacle into snug engagement with the first side of the mounting panel by bearing against the second side of the mounting panel and drawing the receptacle against the first side of the mounting panel in response thereto.

27 Claims, 8 Drawing Sheets

PANEL MOUNTING ASSEMBLY FOR OPTICAL FIBER CONNECTORS

FIELD OF THE INVENTION

The invention relates in general to optical fiber cables, optical fiber connectors, and the connection of the optical fiber connectors to mounting panels. More particularly, the invention relates to an improved panel mounting assembly used for mounting optical fiber connectors to a mounting panel.

BACKGROUND OF THE INVENTION

The use and construction of optical fiber cables, as well as the construction of optical fiber connectors used to terminate these cables, is well known. Optical fiber cables are terminated at their ends with cable end connection devices, which devices may be fabricated as one of the LC, SC, ST®, and and/or FC types of connectors. These cable end connectors are constructed such that they may be fastened to a device known as a buildout, also referred to as an adapter, used to join or couple the separate optical fiber cables together, as well as for aligning the cable ends so that the optical signal may be passed from one cable to another. Oftentimes the buildout is constructed such that it is used to secure itself and the optical fiber connector or connectors fastened thereto to a mounting panel or other mounting device or structure. The mounting panel is also referred to as a backplane, or a backplane coupling by those skilled in the art.

In addition to passing the optical signal from one cable to another, the optical signal may also be passed through the optical fiber cable, as well as the cable end connector, to or from an optical component, for example an amplifier or to a transceiver used to convert the optical signal into a digital signal. However to do this, it is oftentimes necessary to pass the end of the optical fiber cable through some kind of a mounting structure in which the optical and/or electronic component is housed. This has typically been accomplished, as described above, by adapting the buildout for being mounted or fastened to the mounting panel, or the backplane, of the structure housing the components to which the optical fiber cables will be connected, and then connecting the optical fiber cables themselves to the buildout.

An early example of an optical fiber buildout adapted for being fastened to a mounting panel is illustrated in patent, U.S. Pat. No. 5,067,783, entitled Optical Fiber Connector Buildout System. As shown in FIG. 2 of the '783 patent, here dealing with the ST® type connector, a threaded portion of the connector is passed through an opening defined in a mounting panel, whereupon a threaded nut is passed over the threaded portion of the buildout from the other side of the mounting panel for securing the buildout to the mounting panel.

Additional types of buildout constructions, and of mounting panel systems, are illustrated in U.S. Pat. No. 5,274,729 to King, et al., entitled Universal Optical Fiber Buildout System. More particularly, as shown in FIG. 1 thereof, two differing types of panel mount assemblies are shown, namely the threaded type of connection described in the '783 patent above used for an ST® and an FC type of optical fiber connector, and a snap-fit type of construction for the SC family of optical fiber connectors.

U.S. Pat. No. 5,384,885, to Diner, entitled Variable Attenuation Optical Fiber Coupling, shows yet another construction of an optical fiber buildout fastened to a mounting panel. FIG. 1 of the '885 patent, illustrates a buildout having a pair of mounting pieces that are positioned on opposite sides of a mounting panel. A threaded connector, in this instance a screw, is passed through each of the components of the buildout, as well as the mounting panel, for securely affixing the buildout to the mounting panel.

Yet another type of buildout and panel mount construction is shown in U.S. Pat. No. 5,481,634 to Anderson, et al., entitled Connector For Optical Fiber. As shown in FIG. 5 of the '634 patent, the buildout is constructed such that the mounting panel can be received on either side of the center plane of the buildout, the buildout being constructed such that it has a ratcheting type of arrangement for allowing the buildout to be snap-fit snuggly, and securely, to the mounting panel.

What is sometimes desirable in these mounting panel constructions, but not always available, is the ability to move the buildout, or panel mount assembly, in the X and Y directions, i.e., along the horizontal and/or the vertical directions, across the surface plane of the mounting panel in order to make it easier to align the optical fiber connectors with one another based on how slack or taught are the optical fiber cables as they are passed into the buildout, and/or extended through the mounting panel for being fastened to an optical or electronic device within a housing or structure enclosing such a device. As singlemode optical fibers are typically aligned with one another on the order of one micron (0.001 mm), it is desirable to be able to move the cable end connectors into alignment with one another as precisely as possible. Additionally, the ability to move the buildout or adapter in the X and Y directions may also allow the side load forces on the optical fiber connectors and cables to be lessened by allowing a degree of "give" during the connection of the optical fiber cables to the buildout/adapter.

It is possible with some the earlier types of buildout screw mount assemblies, for example the type of assembly shown in the '783 and '729 patents, that the nut of the buildout can be threaded loosely over the barrel or extension of the buildout passed through the mounting panel so that there is some flex or give in the cables when being aligned with one another. The problem, however, with the threaded screw type panel mount assemblies is that if it is desired to leave the nut threaded loosely to allow some "give" in the buildout and/or connection of the optical fiber cables, the screw could possibly back off of the threaded portion of the buildout, and allow the buildout to fall out of its proper mounting position, thus possibly moving the optical fiber cables and or connectors out of alignment with one another allowing a corresponding degradation in the quality of the optical signal passed therethrough.

Similarly, with the device of Diner shown in the '885 patent, while it may be possible to loosely connect the optical fiber buildout to the mounting panel, again, the problem is present that the threaded fasteners may walk out of the mounting panel and/or the buildout halves, or vibration may allow the adapter to move so much that the optical fiber signal is once again degraded. In the "snap-fit" type of optical fiber buildouts, and/or mounting panel constructions, it is typically not possible to have a "loose" fit in the mounting panel, as the buildouts are constructed such that a positive snap-fit occurs once the appropriate portion of the buildout is passed into the mounting panel so that the buildout is securely and rigidly held in position on the mounting panel. Thus, although these types of snap-fit constructions offer ease of construction and simplicity of use in the field, they do not allow X and Y movement in the plane of the mounting panel when attempting to align the optical fiber connectors, or for reducing side load forces on the connectors and optical fiber cables as they are passed through the mounting panel.

What is needed, but apparently unavailable in the art, is an improved panel mount assembly adapted for use with optical fiber cable connectors which can be quickly and easily assembled and held in a secure position on a mounting panel, and which will hold optical fiber connectors as rigidly as desired within a mounting panel opening, but which will also allow movement of the optical fiber connectors in the X and Y directions of the plane of the mounting panel, as desired, for ease of aligning the optical fiber cables, as well as for reducing or limiting side load forces on the optical fiber connectors and/or cables themselves, and which will not otherwise allow the optical fiber connector, or the panel mount assembly, to walk out of the mounting panel opening, or otherwise fall or get knocked out of position therefrom. There is also a need for such an improved panel mount assembly which can be readily adapted for use in multiple or "gang" applications where a large number of optical fiber cables are passed through an elongate, typically a rectangular, mounting panel opening in side by side fashion when several optical fiber cables are being terminated, or signals are being passed through a mounting panel to either optical fiber cables or to optical/electronic components on the other side of the mounting panel.

SUMMARY OF THE INVENTION

The present invention provides an improved panel mounting assembly for use with optical fiber connectors which overcomes some of the deficiencies of the known devices and assembly methods, and which provides a simple, efficient, yet highly flexible apparatus and method of assembling and mounting the device to a mounting panel, and for fastening the optical fiber connectors to the mounting panel. Moreover, the relative simplicity of the construction of the panel mounting assembly of this invention, and method of assembling the panel mounting assembly, when contrasted to the known types of optical fiber buildouts and methods for mounting same to mounting panels, provides a greater degree of simplicity, ease of use, reliability, durability, and maintainability than previously known.

The invention provides a panel mounting assembly constructed of a receptacle for being positioned on a first side of the mounting panel, adjacent, i.e. extending across, a panel opening defined within the mounting panel, and an interlocking clip constructed and arranged to be positioned on the other side of the panel and mated to the receptacle, and which will quickly and rapidly allow the receptacle to be securely positioned on the mounting panel, and which will also allow movement of the receptacle in the X and Y directions along the plane of the mounting panel, when, and as desired.

The panel mounting assembly of this invention therefore includes at least one receptacle having a body portion with a first end and a spaced second end, a pair of spaced sides extending between the ends thereof, and at least one optical fiber connector opening defined within the body. The clip of the panel mounting assembly is constructed and arranged to be mated to the receptacle, the clip having at least one, and preferably two, elongate tongues with each tongue having a spaced series of teeth extending at least partially along the length thereof. The body of the receptacle is provided with at least one, and again preferably a pair, of elongate slots defined therein, and through which the tongue or respective tongues of the clip may be separately passed. A tooth is provided within each one of the elongate slots for being engaged with, i.e. for locking, the teeth of the tongue as they are passed therethrough, such that the clip cannot be withdrawn from the receptacle once the tongues have been passed through the elongate slots thereof. However, as a feature of this construction, the tongues of the clip may be progressively passed through the slots of the receptacle to the desired degree of tightness when fastening the receptacle to the mounting plate, which thus allows the receptacle to be held firmly or loosely on the mounting panel, as desired, but which also securely positions the receptacle on the mounting panel such that it will not walk out or otherwise fall out of position on the panel opening.

The body of the receptacle is provided with a centrally formed raised portion in which at least one optical fiber connector opening is defined for the appropriate type of optical fiber connector being used, be it an LC, SC, ST®, or FC type of optical fiber connector. Although any type of optical fiber connector may be used, the construction of this invention is primarily intended for use with the LC types of optical fiber connectors, due to the compact size and shape of the LC connectors, and the ability to maximize the number of optical fiber connectors within a given length of mounting panel opening. So constructed, the clip will fit about at least a portion of the centrally formed raised portion of the receptacle, when that portion extends through the panel opening defined in the mounting panel.

Another feature of the construction of this invention is that the receptacle and clip can be used with mounting panels of variable thicknesses, thus allowing a greater degree of flexibility in use than available with the known types of optical fiber buildouts, which are intended, primarily, for use with a mounting panel of a known thickness.

In order to enhance the flexibility of this panel mount assembly, it is possible that a plurality of receptacles may be positioned in a side-by-side relationship within an elongate rectangular panel opening, with a single clip, the clip having at least one tongue, and preferably a pair of tongues, for each receptacle, disposed along its length, the single clip being used to hold all the receptacles in position on the panel opening. Moreover, and as described above, each one of the plurality of receptacles can be separately held in position on the mounting panel to the desired degree of tightness thus allowing movement in the X and Y directions along the plane of the mounting panel, to the degree desired. Also, although it is anticipated that a single clip will be used for holding several side-by-side receptacles in position, it is also anticipated that each receptacle could be provided with a separate clip, if so desired, thus providing even greater flexibility in the use of this panel mounting assembly when compared to the known optical fiber buildouts and methods and constructions of mounting same to mounting panels.

The clip of the panel mount assembly of this invention is also provided with a spring formed as a part of each of its side walls, such that once the clip is fastened to the receptacle resting against a first side of the mounting panel, by passing the elongate tongues through the slots in the receptacle, the springs of the clip will bear against the second side of the mounting panel and urge the receptacle, primarily a pair of flanges formed at the respective ends of the receptacle, into a seated firm, or snug, engagement with the first side of the mounting panel to ensure that the receptacle remains in position on the mounting panel, yet again, allows for movement thereof in the X and Y directions of the plane of the mounting panel, as desired.

The improved panel mount assembly of this invention also provides an improved method of assembling and of fastening an optical fiber connector panel mounting assembly to a panel opening within a mounting panel, which method includes the steps of placing at least one receptacle, the receptacle having at last one optical fiber connector opening defined therein, on a first side of the mounting panel so that the at least one optical fiber connector is aligned with the panel opening, and then placing a clip on a second side of the mounting panel, passing at least one elongate tongue formed as a part of the clip through the panel opening and into at least one elongate slot forming the receptacle, and securing the receptacle in position on the first side of the mounting panel in response thereto.

The method of this invention also includes the steps of snugly drawing at least one receptacle against the first side of the mounting panel with a spring formed as a part of the clip, the spring bearing against the second side of the mounting panel when the clip is mated to the receptacle, and also includes the step of placing a plurality of receptacles in a side-by-side relationship on the first side of the mounting panel, and securing each receptacle to the first side of the mounting panel with the clip positioned on the second side of the mounting panel.

It is, therefore, an object of the present invention to provide an improved panel mounting assembly and method of assembling same for use with optical fiber connectors.

It is another object of the present invention to provide an improved panel mounting assembly for optical fiber connectors which is simple in design and construction, is rugged and durable in use, and which is easy to assemble.

It is to these objects, as well as to the other objects, features, and advantages of the present invention, which will become apparent upon reading the Specification, when taken in conjunction with the accompanying drawings, to which this invention is directed.

DETAILED DESCRIPTION OF THE PREFERRED EMBODIMENTS

Figure 1A:
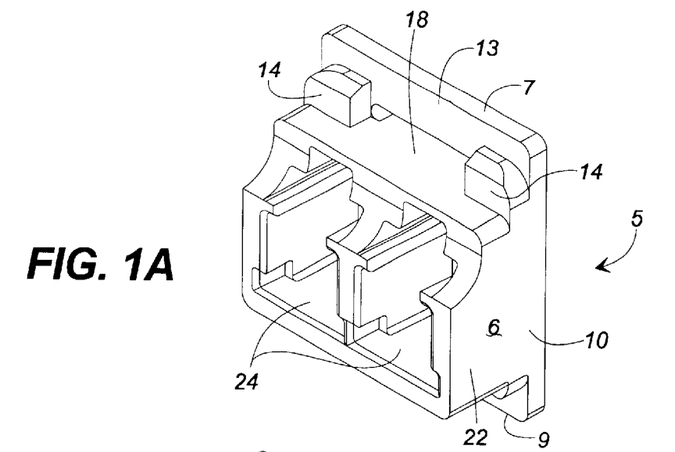
FIG. 1A is a front perspective view of a preferred embodiment of the receptacle of the panel mounting assembly of this invention.
Figure 1B:
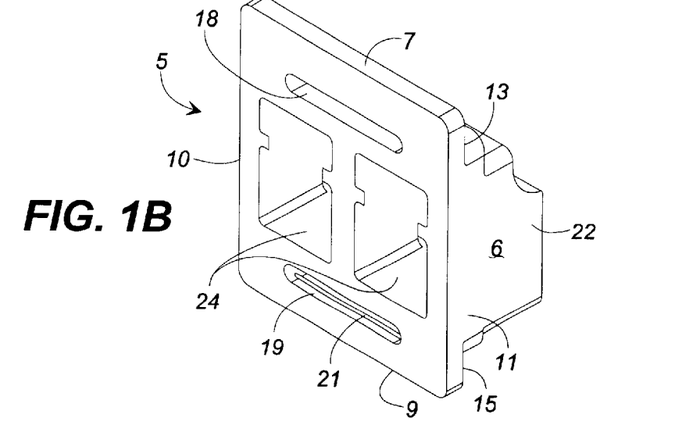
FIG. 1B is a rear perspective view of the receptacle of FIG. 1A.
Figure 1C:
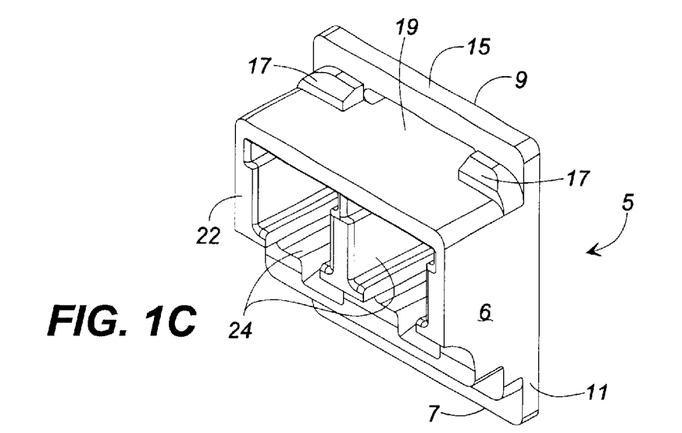
FIG. 1C is a bottom perspective view of the receptacle of FIG. 1A.

Referring now in detail to the drawings, in which like reference characters indicate like parts throughout the several views, a receptacle 5 for use with the panel mounting assembly of this invention is illustrated in FIGS. 1A through 1C. Receptacle 5 is provided as a one-piece structure having a body 6 with a first end 7 and a spaced second end 9. A pair of sides, a first side 10, and second side 11, extend between the two ends for forming the body. A first end flange 13 is formed at the first end of the body by a pair of shoulders 14, and a correspondingly shaped second end flange 15 is formed at the second end of the body by a pair of shoulders 17.

Defined in each of the two respective ends of the body, adjacent the respective flanges 13, 15 is a first elongate slot 18, and a second spaced elongate slot 19. As shown in FIG. 1B, an elongate tooth 21 extends within the slot 19, a similar tooth, not illustrated, extending along the length of the slot 18, for purposes described in greater detail below.

The body of the receptacle 5 includes a centrally formed raised portion 22 in which at least one optical fiber connector opening 24, and in this instance a pair of optical fiber connector openings 24 are defined, or otherwise formed. Although the optical fiber connector openings shown in FIGS. 1A through 1C are for an LC type of optical fiber connector, it is anticipated that the opening or openings 24 defined in the centrally formed raised portion 22 could be shaped, as desired, for the SC, ST®, and FC types of optical fiber connectors, as well as for the other types of optical fiber connectors known in the art manufactured by concerns other than Lucent Technologies, Inc., including the MU style connector manufactured by NTT Corporation, and the LC style connector manufactured by Molex Corporation.

Receptacle 5 is preferably manufactured of polyetherimide ("PEI"), and may also be manufactured of several other plastics, to include polycarbonate, polysulfone, polyethersulfone, as well as other engineering polymers suitable for use in molding receptacle 5 in a quick, expedient, and economical fashion, yet providing the benefits of superior wear and durability in a variety of environmental conditions.

Figure 2A:
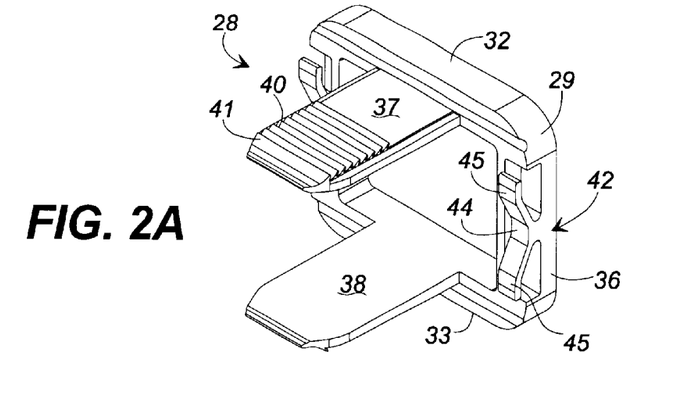
FIG. 2A is a rear perspective view of the clip of the panel mounting assembly of this invention
Figure 2B:
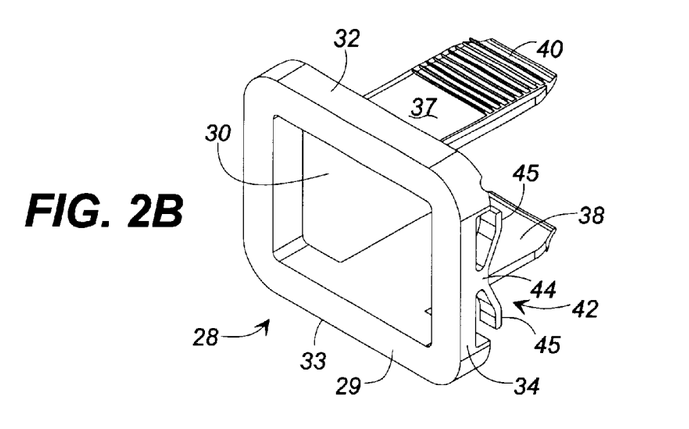
FIG. 2B is a front perspective view of the clip of FIG. 2A.
Figure 2C:
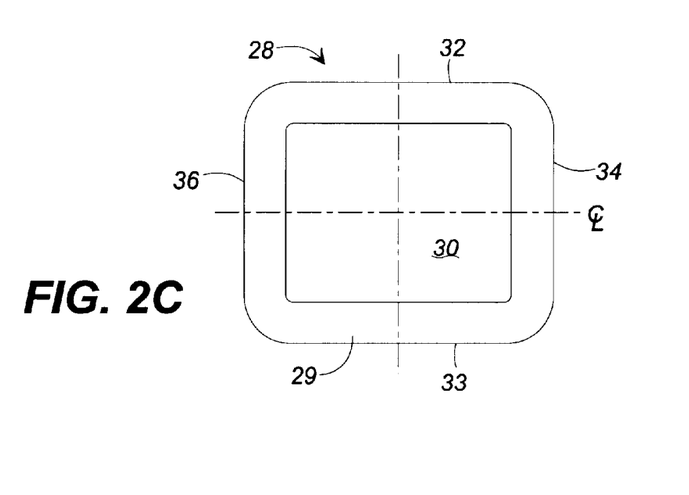
FIG. 2C is a front plan view of the clip of FIG. 2A.

Referring now to FIGS. 2A through 2C, a first embodiment of the clip 28 provided for use with the receptacle 5 of this invention is illustrated. Clip 28 has a frame 29, which may also be referred to as a body if so desired, having a first end 32 and a spaced second end 33, with a pair of sides, first side 34, and second side 36 extending therebetween to form the frame. So constructed, the frame defines an opening 30 centrally therein. The backplane optical fiber connector or connectors that will be connected to the receptacle 5 will be first passed through the opening 30 prior to being passed into the respective optical fiber connector opening, or openings 24 defined in the body of the receptacle, depending on the thickness of the mounting panel.

Extending from the first and second ends of the frame, respectively, is a first tongue 37 and an identical second tongue 38. The two tongues are spaced on the opposite ends of the frame 29, and about the opening 30 defined therein. Each of the tongues is provided with a series of spaced parallel teeth 40 extending substantially across the width of the tongue, which teeth also extend at least partially along the length of the tongue. At the leading end of each tongue, as shown best in FIGS. 2A and 3D, is a ramped portion 41 constructed for allowing the tongue to be readily passed through the corresponding slots 18, 19 defined in the receptacle as the respective tongues are first passed into the corresponding slots of the receptacle during the process of mating the clip to its receptacle, or receptacles, during assembly of the panel mounting assembly.

The frame 29 is also provided with a spring 42 formed in each of the two side walls 34, 36 thereof. The spring 42 is formed as a leaf spring having a central post 44, from which a pair of opposed leaves 45 extend. The purpose of the springs 42, and the manner in which they perform, is described in greater detail below.

Figure 3A:
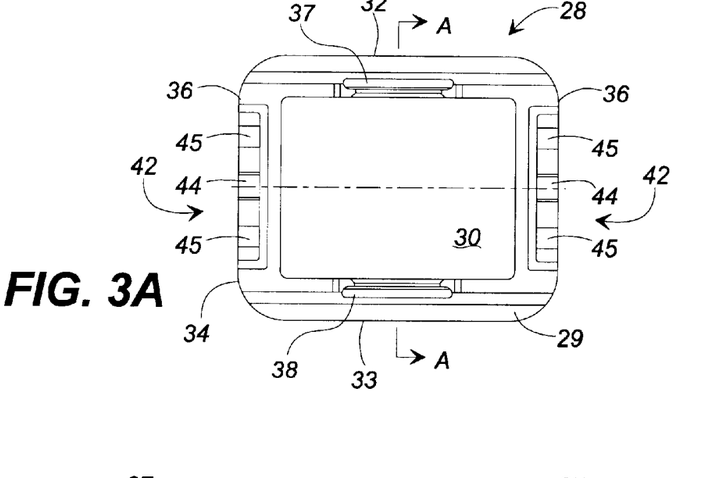
FIG. 3A is a rear plan view of the clip of FIG. 2A.
Figure 3B:
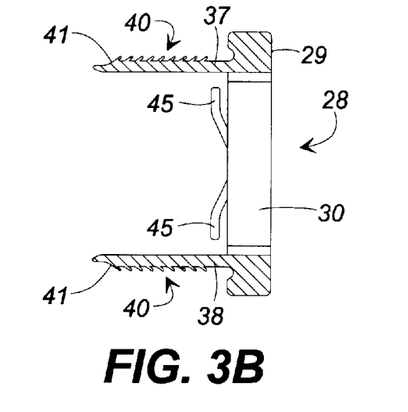
FIG. 3B is a side elevational view in cross section taken along line A—A of the clip in FIG. 3A.

FIG. 3A is a rear plan view of the clip 28 shown in FIGS. 2A through 2C, illustrating the ends 32 and 33 of the clip, as well as its sides 34 and 26, the two tongues 37 and 38, and the two springs 42 formed along the sides of the frame. FIG. 3B is a side elevational view, in cross-section, taken along line A—A of FIG. 3A, which illustrates in greater detail the toothed construction of the tongues 37, 38, as well as the ramped portion 41 defined at the leading edge of each tongue.

Figure 3C:
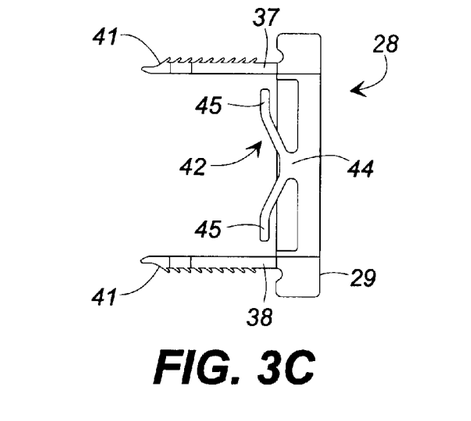
FIG. 3C is a side elevational view of the clip of FIG. 2A.
Figure 3D:
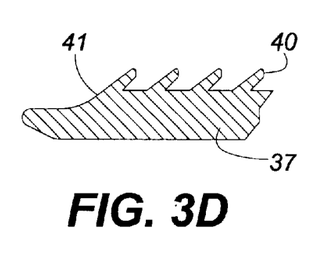
FIG. 3D is an enlarged cross sectional and partially cut away view of the leading end of the elongate tongues of the clip of FIG. 2A.

A side elevational view of the clip 28 is shown in FIG. 3C, which illustrates the spring 42 formed on each of the sides of the clip 28. As shown, the spring 42 has the central post 44 formed as a part of the side wall of the clip, from which the pair of identically shaped leaves 45 extend, the leaves extending beyond the frame 29 in the direction of the tongues 37 and 38, and being provided for bearing against the mounting panel when the clip is passed therethrough. So constructed the leaves 44 will urge the receptacle 5 snugly against the other side of the mounting panel by drawing the respective end flanges 13, 15 of the receptacle against the mounting panel by pushing, as it were, the frame away from the other side of the mounting panel once the teeth 40 of the respective tongues 37, 38 are "locked" to or otherwise engaged with the tooth 21 formed in each of the two respective slots 18, 19 of the receptacle, thus drawing the receptacle snugly against the mounting plate due to the spring action of the spring 42 in concert with the frame 29 of the clip 28.

Figure 4A:
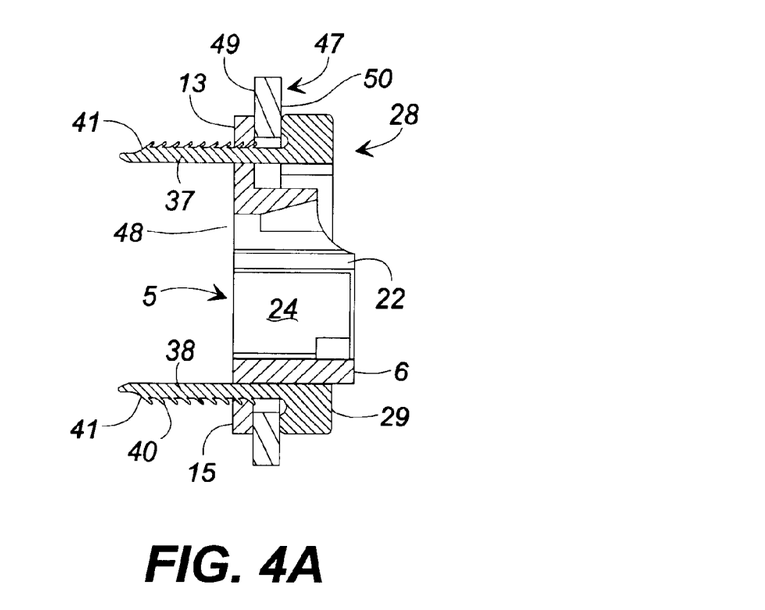
FIG. 4A is a side elevational view in cross-section of the first embodiment of the clip and of the receptacle of the panel mounting assembly of this invention assembled to a mounting panel.
Figure 4B:
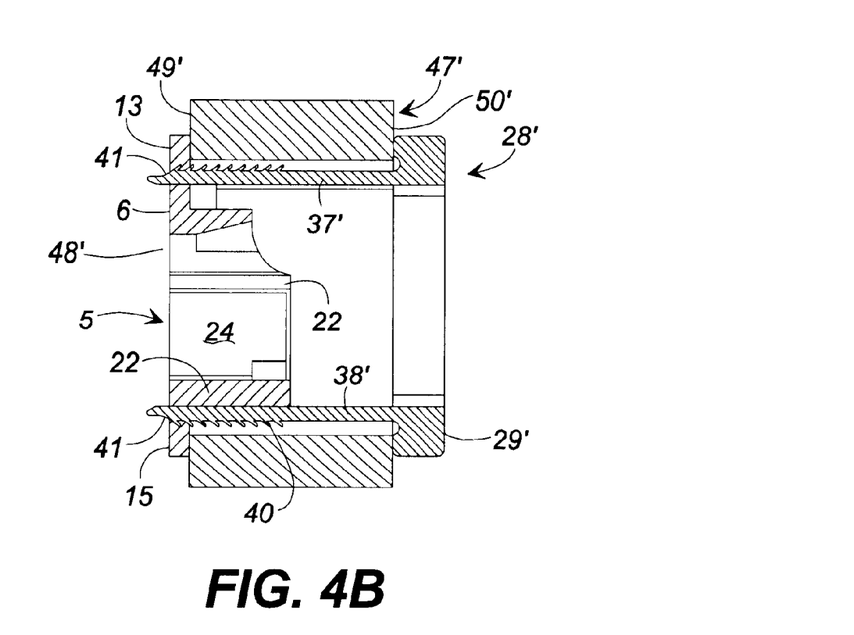
FIG. 4B is a side elevational view on cross-section of the second embodiment of the clip and of the receptacle of the panel mounting assembly of this invention assembled to a mounting panel.

FIGS. 4A and 4B show the respective end flanges 13, 15 drawn snugly against the mounting panel after assembly of the clip to the receptacle. If it is desired to securely position the receptacle on the mounting panel, and movement of the receptacle in the X and Y directions of the plane of the mounting panel is not otherwise desired, or necessary, then the tongues of the clip will be extended through the slots of the receptacle as fully as possible to tightly secure the receptacle in position on the mounting panel. When, and if, the receptacle is affixed to the mounting panel this securely, then the leaves 45 will yield to the pressure of the teeth 40, 21, and will be urged toward the respective sides of the clip and into a retracted position within the cavities defined in the side walls of the clip. If movement of the receptacle in the X and Y directions along the plane of the mounting panel is desired, the tongues will be passed through the slots of the receptacle so that the desired degree of tightness of the receptacle on the first surface or side of the mounting panel is attained, whereupon the springs 42 will bear against the second surface or side of the mounting panel, pushing the frame 29 away from the mounting panel, the frame in turn drawing or pulling the receptacle snugly, but yieldably against the first side of the mounting panel. The receptacle, however, remains locked to or securely positioned on the mounting panel, in either mode of assembly.

FIG. 3D illustrates in an enlarged partially cut away view, the leading end of each tongue 37, 38, and in particular the parallel teeth 40 formed in spaced series thereon, as well as the ramped portion 41 at the leading end of each tongue. The teeth 40 are formed so as to angle back toward the frame 29 of the clip, and away from the direction of the movement when the tongue is passed through one of the slots of the receptacle to allow the tongues to readily pass through the respective slots 18, 19 of the receptacle. However, due to the configuration of the teeth 40, namely being angled backwards, the teeth will yieldably pass beneath the tooth 21 formed within each one of the elongate slots 18, 19 and then resiliently expand to their upright position, as shown in FIG. 3D, to more or less permanently affix the clip to the receptacle such that the clip cannot be readily withdrawn from the receptacle.

The clip, preferably, is made of nylon for the purposes of allowing the teeth 40 to deflect or yield to the tooth 21 of the two slots defined in the receptacle, but yet which is a strong enough material that the teeth will not otherwise strip when it is attempted to remove the clip from the receptacles. The clip 28 may also be made of polycarbonate, or of several other plastics, to include, polysulfone, polyethersulfone, as well as other engineering polymers used to make the receptacle 5.

If someone were to force the clip out of the receptacle, the teeth 40 of the tongue will hopefully yield to the tooth 21 prior to the tooth 21 breaking off within the slots of the receptacle as PEI is a more rigid material than the nylon material of which the clip is made, and the clip, although it may be permanently deformed, will yield allowing the receptacle to be reused, whereas in all likelihood a new clip will be required. Also, it is anticipated that a tooth 21 need not necessarily be provided within each slot 18, 19, but that rather the teeth 40 of the two tongues could directly engage the peripheral surface of the respective slots 18 and 19, the peripheral edges of the slots acting as the teeth for engaging, and retaining, the tongues 37, 38 of the clip therein.

Figure 3E:
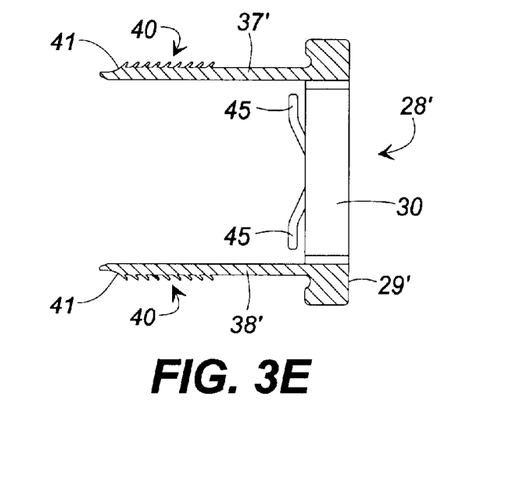
FIG. 3E is a side elevational view in cross section taken along line A—A of the clip FIG. 3A illustrating a second embodiment of the clip of the panel mounting assembly of this invention.

A second embodiment of the clip 28' is shown in FIG. 3E, the second embodiment of the clip varying from the first embodiment shown in FIGS. 3A through 3C namely in the length of the two tongues 37', 38'. Otherwise, the clip 28' is constructed identically having a frame 29' forming an opening 30, from which the two tongues 37', 38' extend. Each of the tongues is provided with a spaced and parallel series of teeth 40 extending across the tongue, and at least partially along the length thereof, with the ramped portion 41 provided at the leading end of each tongue. The second embodiment of the clip 28' is also provided with two springs 42, as shown in FIG. 3E.

The second embodiment of the clip is provided so that when a mounting panel of a greater thickness than that used with the first embodiment of the clip is encountered, that the panel mounting assembly will still operate as intended, namely the clip will be used to securely position the receptacle on the panel opening of the mounting panel, and yet which will allow movement in the X and Y directions of the plane of the mounting panel, if desired, and snugly draw the receptacle against the surface of the mounting panel, if desired, through the use of the springs 42.

FIGS. 4A and 4B illustrate the two embodiments of the clip 28 and 28', respectively, of the panel mounting assembly of this invention in use with a first thin wall mounting panel 47, and a second thicker mounting panel 47'. Referring first to FIG. 4A, the receptacle 5 is positioned within a panel opening 48 defined in the mounting panel, such that the two flanges 13, 15 of the receptacle rest against the first side 49, or interior surface, of the mounting panel 47. Once held in position, typically by a tool (not illustrated) or the service technician's hand or fingers, the clip 28 is placed in position on the second side 50 of the mounting panel, the two tongues 37 and 38 of the clip being passed through the panel opening 48 and then into the two elongate slots 18, 19 (FIGS. 1A through 1C) of the receptacle, by passing the ramped portion 41 and then the teeth 40 therethrough for securely affixing the receptacle in position on the mounting panel 47. The flanges 13, 15 of the receptacle, and the frame 29 of the clip may sandwich the mounting panel as tightly as desired by passing the tongues through the slots of the receptacle to the depth desired, or may be left to be a little "loose" such that the springs 42 of the frame, as shown in FIGS. 2B and 2C, snugly urge the flanges, and thus the receptacle, into engagement with the first side 49 of the mounting panel, as described above.

FIG. 4B illustrates the second embodiment of the mounting clip 28' of this invention, in use with a thick wall mounting panel 47'. Once again, however, the same receptacle 5 is used, it being placed in position on a panel opening 48' defined in the mounting panel. The two flanges 13, 15 of the receptacle rest against the first side 49', or the interior surface, of the mounting panel, the receptacle being held in position by a tool (not illustrated) or the service technician, while the tongues 37', 38' of the clip 28' are passed through the panel opening 48 and into the two respective slots 18, 19 defined in the receptacle, the ramped portion 41 of each tongue being passed through the slot, the teeth 40 then engaging the tooth 21 within each slot for securely positioning the receptacle in position on the panel opening 48'. Again, the receptacle can be drawn as snugly as desired against the first side 49' of the mounting panel, by passing the tongues 37', 38' through the slots in the receptacle to the degree desired, or the receptacle may be allowed to sit loosely within the panel opening, the two springs 42 (FIGS. 2B, 2C) being used to snugly urge the flanges of the receptacle, and thus the receptacle itself, snugly against the panel opening 48'.

Another difference between the two embodiments of the clip of the panel mount assembly is illustrated in FIGS. 4A and 4B. In FIG. 4A, the clip 28, and primarily the frame 29, fits about at least a portion of the centrally formed raised portion 22 of the body 6 as shown. The second end 33, and the two sides 34, 36 of the frame will lie about at least a portion of the raised portion of the body of the receptacle, it also being anticipated that a portion of the first end 32 (FIGS. 2A through 2C) of the clip/frame may also lie against the raised portion 22 to the extent that it projects far enough forward that the frame will engage it. This helps to ensure that the receptacle is snugly held in position within the panel opening 48. In the second embodiment of this invention, however, as shown in FIG. 4B, the clip 28' will typically not fit about a portion of the raised portion 22 due to the thickness of the mounting panel 47', although if the mounting panel is not as thick as that shown in FIG. 4B, then a portion of the frame 29' may fit about at least a portion of the raised portion 22 of the body, again dependent on the thickness of the mounting panel in which the panel mounting assembly is being used. In either case, a typical clearance of 0.4 mm surrounds the receptacle 5 and clip 28 when mated to one another relative to the panel opening 48 in the mounting panels 47, 47' in order to facilitate travel of the receptacle and the clip in the X and Y directions.

Figure 5A:
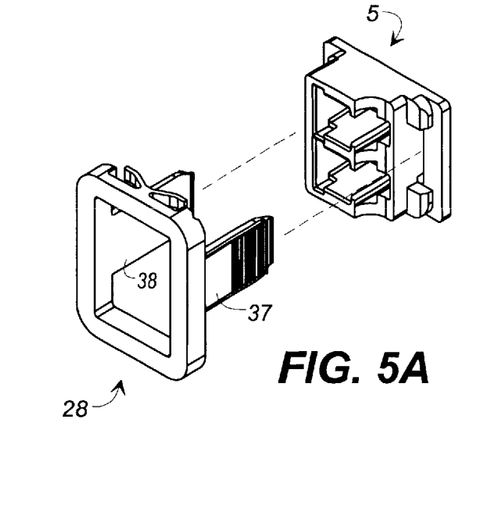
FIGS. 5A through 5C illustrate three different embodiments of the clip of this invention in use with the receptacle of the panel mounting assembly of this invention.
Figure 5B:
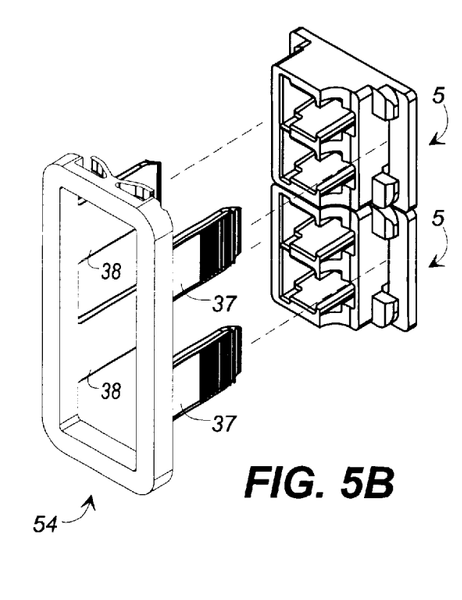
Figure 5C:
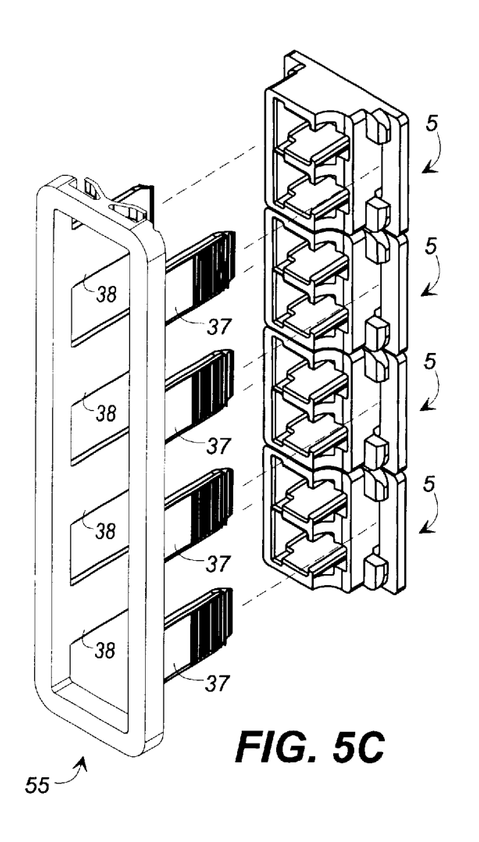
Figure 6A:
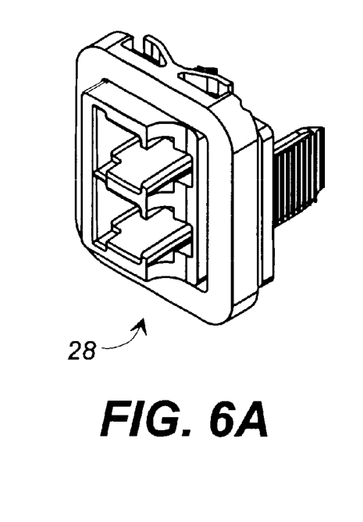
FIGS. 6A through 6C illustrate the clips of FIGS. 5A through 5C mated to the appropriate number of receptacles of the panel mounting assembly of this invention.
Figure 6B:
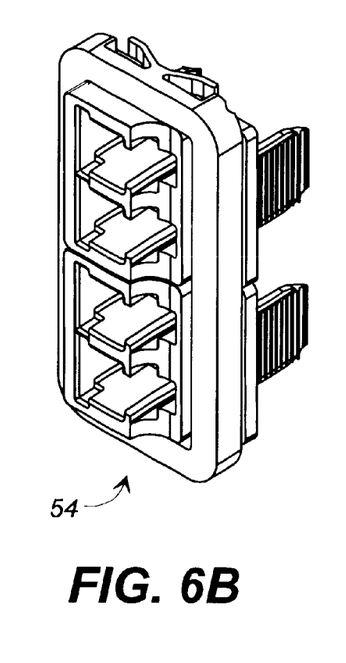
Figure 6C:
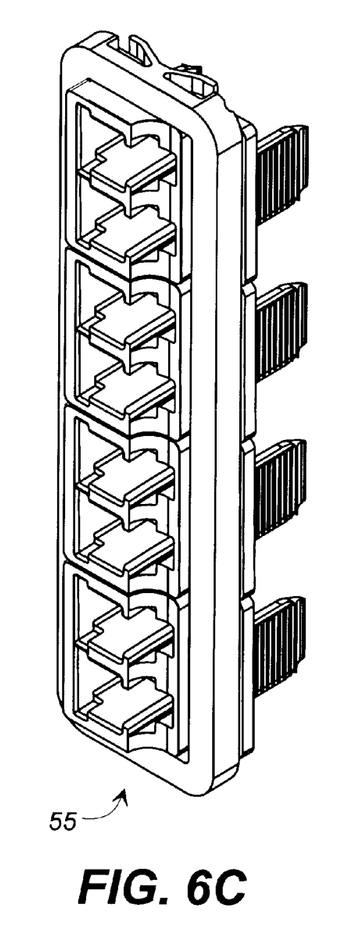
Figure 7A:
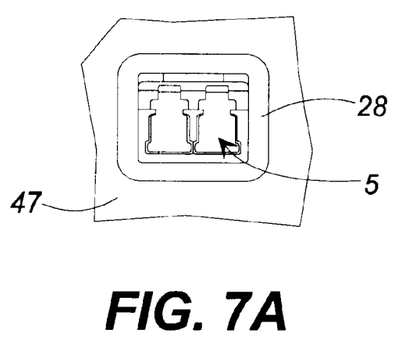
FIGS. 7A through 7C are three front plan views of the three embodiments of the clip, and of the receptacle of this invention, secured to a mounting panel.
Figure 7B:
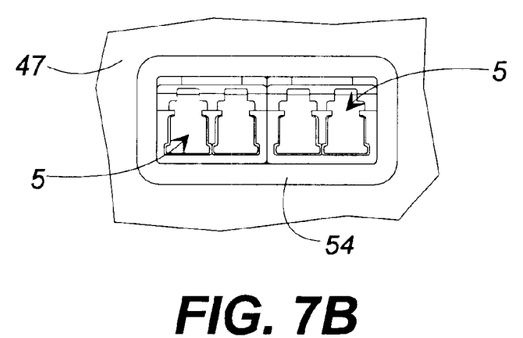
Figure 7C:
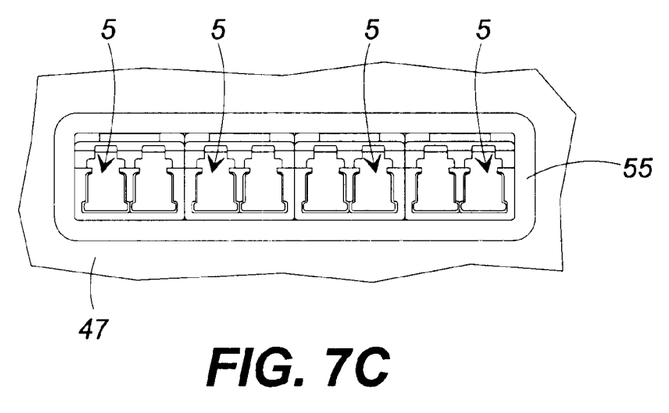

FIGS. 5A through 5C, 6A through 6C, and 7A through 7C illustrate three differing embodiments of the panel mounting assembly of this invention, each embodiment using either a single receptacle 5, or a multiple number of the receptacles 5 as described above, placed side by side, and then either the clip 28 or 28', or a clip 54 or 55, as shown, the clips 54 and 55 being constructed for use with two receptacles 5, or four receptacles 5, respectively. Clips 54 and 55 may be provided with the "short" tongues of clip 28, or the longer tongues of clip 28', as desired. FIGS. 6A through 6C show the clips and the receptacles mated to one another (mounting panels not shown), as would be the case where the receptacles and clips are being used to assemble the panel mounting assembly about a mounting panel, as shown in FIGS. 7A through 7C in front, or top, plan view.

The embodiments of the invention shown in FIGS. 5A through 5C, 6A through 6C, and 7A through 7C are intended as illustrative only, and are not limiting in that it is anticipated that the clips 28, 28' of this invention could be modified for use with any number of receptacles 5 as desired. For example, and as shown in FIGS. 1A through 1C and 2A through 2C, as well as in FIGS. 5A, 6A, and 7A, the clip 28 is used with a single receptacle 5. However, the panel mounting assembly of this invention could use two receptacles 5 as shown in FIG. 5B, three receptacles 5, four receptacles 5 as shown in FIG. 5C, or any number of receptacles, as desired, limited only by the size of the respective panel opening in which the receptacles are placed. Thus, the panel mounting assembly of this invention will use the receptacle 5, but may have a variety of clips 28, 28', 54, and/or 55 as shown in FIGS. 5A through 5C, based on the configuration of the panel mounting assembly assembled, again limited only by the size of the panel opening defined in the mounting panel to which the panel mounting assembly is fastened. Additionally, but not illustrated, it is also possible to modify the receptacle 5 such that it will be provided with a greater number of optical fiber connector openings 24 than shown, as desired. For example, there may be a single receptacle provided with eight separate optical fiber connector openings for use with the clip 55, and so on. Again, the disclosed construction of the receptacle 5 is illustrative only, and is not intended to otherwise limit the size/number of optical fiber connector openings of the receptacle.

Figure 8:
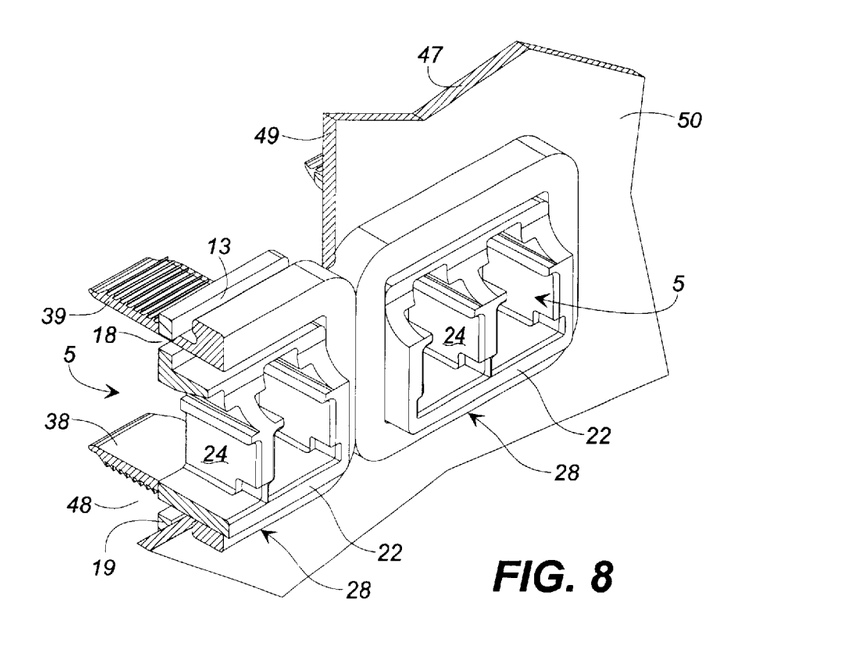
FIG. 8 is a front perspective view in partial cross-section of a pair of the receptacles and of the first embodiment of the clip of the panel mount assembly of this invention positioned within a mounting panel opening.

It is also possible, as shown in FIG. 8, that the panel mounting assembly could use a single clip 28 for each receptacle 5, the receptacles 5 being placed in side-by-side position alongside the length of the panel opening 48 of the mounting panel 47, all as desired. It is also possible, although not illustrated, that various combinations of clips 28, 54, 55, and receptacles 5, could be used, such that, for example, there may be a single receptacle 5 and clip 28 in the panel opening, there then may be two clips 54 holding a total of four receptacles 5 in position, and there may be one clip 55 holding four more receptacles 5 in position, all within a single mounting panel opening, to allow for the expansion of the number of receptacles placed in the mounting panel, when desired.

FIGS. 7A through 7C illustrate in a top or front plan view the appearance of the respective embodiments of the clip 28/28', 54, and 55, with the receptacles 5, when the receptacles are positioned at the panel opening 48 of a mounting panel 47, and held in position by the respective embodiments of the clip.

FIG. 8 once again illustrates the manner in which the clips 28 will hold the receptacles 5 in position on a mounting panel 47, which receptacle construction is the same for all embodiments of the clips shown in FIGS. 5, 6, and 7, varying only by the size of the clip and the number of receptacles held in position by the clip. In FIG. 8 two clips 28 are being used to hold two receptacles 5 in side by side position, which could also be accomplished by the construction shown in FIG. 7B, all as desired. For example, it may be that the original panel mount assembly of FIG. 8 included only a single receptacle 5 and a clip 28, and it then became desirable to add a second receptacle and clip, and sufficient amount of space was available in the panel opening to do so without having to replace the clip 28 with the clip 54. The only drawback to the construction shown in FIG. 8 is that the two sides of the adjoining clips will increase the length of the panel mounting assembly within the panel opening 48, thus perhaps limiting the number of receptacles that may be ultimately positioned within the panel opening, and affixed to the mounting panel.

As shown in FIG. 8, the receptacles 5, primarily through their respective end flanges 13, 15 rest against the first side 49 of the mounting panel. The tongues 37, 38 of the clip are passed through the panel opening 48, and then passed through the respective slots 18, 19, such that the teeth 40 engage the tooth 21 within each of the slots for securely positioning or affixing the receptacle on the mounting panel 47. Not shown in FIG. 8, but illustrated in FIGS. 2B and 2C, is the construction of spring 42, such that if the receptacle, or receptacles, are allowed to "float" within the panel opening 48 to allow movement thereof in the X and Y directions of the mounting panel, then the spring will urge the flanges of the receptacle into a snug engagement with the first side 49 of the mounting panel, thus ensuring that it is seated properly, yet allowing some "give" in the panel mounting assembly during the alignment of the optical fiber connectors and/or cables with one another, and which will also, it is hoped, reduce side load forces or other loading forces within the optical fiber connectors and/or cables, or other optical components with which the panel mounting assembly is used.

Figure 9:
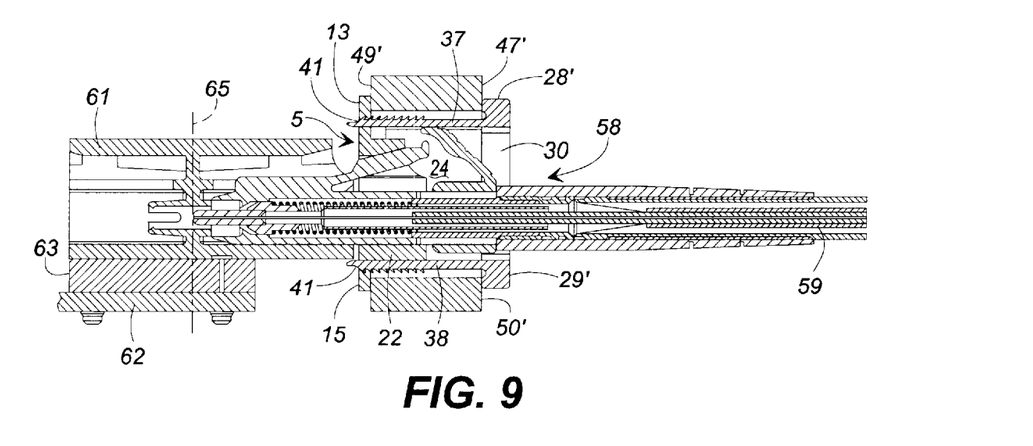
FIG. 9 is a side elevational view in cross-section of the panel mounting assembly of this invention in use with an optical fiber connector, an adapter, and a PC adapter mounting board.

In FIG. 9, the second embodiment 28' of the clip of this panel mounting assembly is shown in use with a receptacle 5, in association with an optical fiber connector 58 terminating an optical fiber cable 59, the optical fiber connector being received within a one-piece optical fiber adapter 61 in what is referred to as a "blind" mounting on the inside of a mounting panel, for example within a structure housing optical components. The adapter 61 has an alignment sleeve (not shown) and a second optical fiber connector (not shown) meeting at the optical plane 65 of the adapter, or a component provided as a part thereof, or may provide one of the known types of optical to digital conversion devices, for example a transceiver for converting an optical signal to an electrical signal and vice versa. The one-piece adapter 61 is affixed to a printed circuit board 62, and, in this instance, has an optical mounting block 63 used for mounting the adapter 61 to the printed circuit board 62. However, no matter how used, the construction of receptacle 5, and of the clips 28, 28', whatever configuration the clips may be provided, as shown in FIGS. 5 through 7, remains the same, this being the advantage of this invention, namely the simplicity and ease of use, and the repeated results which can be obtained in using this system, all while allowing movement in the X and Y directions of the plane of the mounting panel, when, and as desired.

Although several preferred embodiments in the invention have been disclosed in the foregoing specification, it is understood by those skilled in the art that many modifications and other embodiments of the invention will come to mind to which the invention pertains, having the benefit of the teaching presented in the foregoing description and the associated drawings. It is thus understood that the invention is not limited to the specific embodiments disclosed herein, and that many modifications and other embodiments of the invention are intended to be included within the scope of the appended claims. Moreover, although specific terms are employed herein, as well as in the claims, they are used in a generic and descriptive sense only, and not for the purposes of limiting the described invention, nor the claims which follow.

I claim:

1. A panel mounting assembly for use in mounting an optical fiber connector to a mounting panel, said assembly comprising:

at least one receptacle, said receptacle having a body portion with a first end and a spaced second end, a pair of spaced sides extending between said first and second ends, and at least one optical fiber connector opening defined within the body; and a clip constructed and arranged to be mated to said at least one receptacle, said clip having at least one elongate tongue, said at least one tongue having a spaced series of teeth extending at least partially along the length thereof;

the body of the receptacle having at least one elongate slot defined therein and through which said at least one tongue may be passed, and a tooth formed within said slot for being engaged with the teeth of said at least one tongue.

2. The panel mounting assembly of claim 1, said clip being sized and shaped to fit about at least a portion of the body of the receptacle.

3. The panel mounting assembly of claim 1, said body having at least a pair of spaced optical fiber connector openings defined therein.

4. The panel mounting assembly of claim 1, said body having two of said elongate slots defined therein, one each of said slots at a respective end of said body.

5. The panel mounting assembly of claim 4, said clip having a spaced pair of said elongate tongues, one said tongue for each said slot defined in the body of the receptacle.

6. The panel mounting assembly of claim 1, said assembly comprising at least a pair of said receptacles, said clip being constructed and arranged to hold the receptacles in position with respect to one another.

7. The panel mounting assembly of claim 6, the receptacles being held in a side by side relationship with respect to one another by said clip.

8. The panel mounting assembly of claim 6, said clip having at least one said elongate tongue for each said receptacle.

9. The panel mounting assembly of claim 8, said clip having a pair of said elongate tongues for each said receptacle.

10. The panel mounting assembly of claim 1, the body of said receptacle having a centrally formed raised portion within which said at least one optical fiber connector opening is defined.

11. The panel mounting assembly of claim 10, said clip being sized and shaped to fit about at least a portion of the raised portion of the receptacle.

12. The panel mounting assembly of claim 1, said clip having a spring formed as a part thereof for urging the receptacle against the mounting panel when the clip and the receptacle are mated to one another.

13. A panel mounting assembly for use in mounting an optical fiber connector to a mounting panel of variable thickness, the mounting panel having a panel opening defined therein through which the optical fiber connector may be passed, said assembly comprising:
   at least one receptacle sized and shaped to be received against a first side of the mounting panel adjacent the panel opening, said receptacle having a body portion with at least one optical fiber connector opening defined therein; and
   a clip sized and shaped to be received against a second side of the mounting panel adjacent the panel opening, said clip being constructed and arranged to be mated to said at least one receptacle and to secure the receptacle in position on the first side of the mounting panel;
   said clip having at least one elongate tongue formed as a part thereof, said at least one tongue having a spaced series of teeth extending at least partially along the length thereof;
   the body of the receptacle having at least one elongate slot defined therein and through which said at least one tongue may be passed, and a complimentary tooth formed within said slot for being engaged with the teeth of said at least one tongue;
   whereby the tongue of the clip may be passed through the slot of the receptacle to securely position the receptacle on the first side of the mounting panel.

14. A panel mounting assembly for use in mounting an optical fiber connector to a mounting panel of variable thickness, the mounting panel having a panel opening defined therein through which the optical fiber connector may be passed, said assembly comprising:
   at least one receptacle sized and shaped to be received against a first side of the mounting panel adjacent the panel opening, said receptacle having a body portion with at least one optical fiber connector opening defined therein; and
   a clip sized and shaped to be received against a second side of the mounting panel adjacent the panel opening, said clip being constructed and arranged to be mated to said at least one receptacle and to secure the receptacle in position on the first side of the mounting panel;
   the receptacle having a first end and a spaced second end, and a flange formed at each respective end thereof for being received against the first side of the mounting panel adjacent the panel opening.

15. A panel mounting assembly for use in mounting an optical fiber connector to a mounting panel of variable thickness, the mounting panel having a panel opening defined therein through which the optical fiber connector may be passed, said assembly comprising:
   at least one receptacle sized and shaped to be received against a first side of the mounting panel adjacent the panel opening, said receptacle having a body portion with at least one optical fiber connector opening defined therein; and
   a clip sized and shaped to be received against a second side of the mounting panel adjacent the panel opening, said clip being constructed and arranged to be mated to said at least one receptacle and to secure the receptacle in position on the first side of the mounting panel;
   the receptacle having a first end and a spaced second end, and a raised portion between the ends thereof in which the at least one optical fiber connector opening is defined, which raised portion is sized and shaped to extend into and at least partially through the panel opening defined in the mounting panel.

16. The panel mounting assembly of claim 15, said clip being sized and shaped to fit about at least a portion of the raised portion of the receptacle.

17. A panel mounting assembly for use in mounting an optical fiber connector to a mounting panel of variable thickness, the mounting panel having a panel opening defined therein through which the optical fiber connector may be passed, said assembly comprising:
   at least one receptacle sized and shaped to be received against a first side of the mounting panel adjacent the panel opening, said receptacle having a body portion with at least one optical fiber connector opening defined therein; and
   a clip sized and shaped to be received against a second side of the mounting panel adjacent the panel opening, said clip being constructed and arranged to be mated to said at least one receptacle and to secure the receptacle in position on the first side of the mounting panel;
   said clip having a spring formed as apart thereof and positioned to bear against the second side of the mounting panel when the receptacle and the clip are mated to one another for urging the receptacle snugly against the first side of the mounting panel.

18. A panel mounting assembly for use in mounting an optical fiber connector to a mounting panel of variable thickness, the mounting panel having a panel opening defined therein through which the optical fiber connector may be passed, said assembly comprising:
   at least a pair of receptacles, each of which is sized and shaped to be received against a first side of the mounting panel adjacent the panel opening, each said receptacle having a body portion with at least one optical fiber connector opening defined therein; and
   a clip sized and shaped to be received against a second side of the mounting panel adjacent the panel opening, said clip being constructed and arranged to be mated to the at least one pair of receptacles and to secure each the respective receptacle in position on the first side of the mounting panel;
   said clip being constructed and arranged to hold each of the receptacles in position with respect to one another on the panel opening of the mounting panel.

19. The panel mounting assembly of claim 18, the at least a pair of receptacles being held in a side by side relationship with respect to one another by said clip.

20. The panel mounting assembly of claim 18, said clip having at least one elongate tongue formed as a part thereof for each said receptacle, said at least one tongue having a spaced series of teeth extending at least partially along the length thereof, each said receptacle having at least one elongate slot defined therein and through which said at least one tongue may be passed, and a complimentary tooth formed within said slot for being engaged with the teeth of said at least one tongue, whereby the respective tongues of the clip may be passed through the at least one slot of the respective receptacles to securely position the receptacles on the first side of the mounting panel.

21. The panel mounting assembly of claim 20, said clip having a pair of said tongues for each said receptacle.

22. A method of fastening an optical fiber connector panel mounting assembly to a panel opening defined in a mounting panel of variable thickness, comprising the steps of:

placing at least one receptacle, the at least one receptacle having at least one optical fiber connector opening defined therein, on a first side of the mounting panel so that the at least one optical fiber connector opening is aligned with the panel opening; and placing a clip on a second side of the mounting panel and passing at least one elongate tongue formed as a part of the clip through the panel opening and into at least one elongate slot formed in the receptacle for securing the receptacle in position on the first side of the mounting panel.

23. The method of claim 22, comprising the step of extending at least a portion of the receptacle through the panel opening from the first side of the mounting panel toward the second side thereof.

24. The method of claim 23, comprising the step of passing at least a portion of the clip around the at least a portion of the receptacle extended through the panel opening.

25. The method of claim 22, comprising the step of snugly drawing the at least one receptacle against the first side of the mounting panel with a spring formed as a part of the clip, said spring bearing against the second side of the mounting panel when the clip is mated to the at least one receptacle.

26. The method of claim 22, comprising the step of placing a plurality of said receptacles in a side by side relationship on the first side of the mounting panel in alignment with the panel opening defined within the mounting panel, and securing each said receptacle to the first side of the mounting panel with said clip positioned on the second side of the mounting panel.

27. A method of fastening an optical fiber connector panel mounting assembly to a panel opening defined in a mounting panel of variable thickness, comprising the steps of:

placing at least one receptacle, the at least one receptacle having at least one optical fiber connector opening defined therein, on a first side of the mounting panel so that the at least one optical fiber connector opening is aligned with and extends at least partially into the panel opening; and placing a clip on a second side of the mounting panel and passing at least one elongate tongue formed as a part of the clip through the panel opening and into at least one elongate slot formed in the receptacle for securing the receptacle in position on the first side of the mounting panel.

* * * * *